US012640415B2

(12) United States Patent
Tucker et al.

(10) Patent No.: US 12,640,415 B2
(45) Date of Patent: May 26, 2026

(54) FLUID-COOLED BATTERY SYSTEM

(71) Applicant: XING POWER INC., Victoria (SC)

(72) Inventors: Kareem Azizi Tucker, Taipei (TW);
Yu-Chung Lin, Taipei (TW)

(73) Assignee: XING POWER, INC., Victoria (SC)

( * ) Notice: Subject to any disclaimer, the term of this
patent is extended or adjusted under 35
U.S.C. 154(b) by 0 days.

(21) Appl. No.: 18/218,904

(22) Filed: Jul. 6, 2023

(65) Prior Publication Data

US 2023/0352759 A1     Nov. 2, 2023

Related U.S. Application Data

(63) Continuation of application No. 16/388,282, filed on
Apr. 18, 2019, now Pat. No. 11,742,533.

(51) Int. Cl.
| | |
|---|---|
| *H01M 10/613* | (2014.01) |
| *H01M 10/625* | (2014.01) |
| *H01M 10/643* | (2014.01) |
| *H01M 10/651* | (2014.01) |
| *H01M 10/6557* | (2014.01) |
| *H01M 10/656* | (2014.01) |
| *H01M 50/213* | (2021.01) |
| *H01M 50/227* | (2021.01) |
| *H01M 50/271* | (2021.01) |

(52) U.S. Cl.
CPC ....... *H01M 10/613* (2015.04); *H01M 10/625*
(2015.04); *H01M 10/643* (2015.04); *H01M
10/651* (2015.04); *H01M 10/6557* (2015.04);

*H01M 10/656* (2015.04); *H01M 50/213*
(2021.01); *H01M 50/227* (2021.01); *H01M
50/271* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 7,671,565 | B2 * | 3/2010 | Straubel | H01M 50/522 |
| | | | | 320/136 |
| 2011/0206968 | A1 * | 8/2011 | Nishimura | H01M 10/647 |
| | | | | 429/120 |
| 2015/0132629 | A1 * | 5/2015 | Lee | H01M 50/262 |
| | | | | 429/120 |
| 2016/0336629 | A1 * | 11/2016 | Cho | H01M 10/6556 |
| 2017/0005303 | A1 * | 1/2017 | Harris | H01M 10/625 |
| 2018/0138476 | A1 * | 5/2018 | Yamazaki | H01M 10/643 |

* cited by examiner

*Primary Examiner* — Maria Laios

(57) ABSTRACT

A fluid-cooled battery system includes at least one battery
module which includes a plurality of rows of battery cells,
an outer casing, and at least one cell fixture. The outer casing
defines therein an accommodation space. The cell fixture
includes a holding web fitted inside the accommodation
space, and formed with a plurality of rows of retaining holes.
The retaining holes of each row are configured to retain cell
bodies of a respective row of the battery cells so as to permit
the battery cells to be held in the accommodation space by
the holding web, to thereby keep the battery cells in stable
position against undesired vibration.

9 Claims, 7 Drawing Sheets

FLUID-COOLED BATTERY SYSTEM

REFERENCE TO RELATED APPLICATION

This application is a continuation of U.S. patent application Ser. No. 16/388,282, filed on Apr. 18, 2019, the contents of which is incorporated herein by reference in its entirety.

FIELD

The disclosure relates to a battery system, more particularly to a fluid-cooled battery system.

BACKGROUND

U.S. Pat. No. 6,953,638 B2 discloses a conventional fluid-cooled battery pack system which can maintain the variation in battery temperature in a battery pack within the permissible temperature range even when the variation in the gaps between battery modules is considered. A plurality of battery modules are each provided with a plurality of convex portions and concave portions on the sides thereof, where the connections to other battery modules are made. When the battery modules are connected by bringing the opposite convex portions into contact with each other, coolant flow paths, through which a coolant flows, are formed. The target width of the coolant flow paths is set so that the variation in temperature relative to the target temperature of each battery module is maintained within a predetermined range when the coolant flows through the coolant flow paths, the variation in temperature is caused by a fabrication tolerance relative to the target width of the coolant flow paths between the battery modules.

U.S. patent application publication no. 2010/0092849 A1 discloses a conventional battery module which includes a housing configured to receive a plurality of cells. The housing includes a first tray and a second tray. Each of the plurality of cells is received within a depression of at least one of the first tray and the second tray.

SUMMARY

An object of the disclosure is to provide a novel fluid-cooled battery system.

According to the disclosure, a fluid-cooled battery system includes at least one battery module which includes a plurality of rows of battery cells, an outer casing, and at least one cell fixture. Each of the battery cells has a cell body extending in an upright direction. The battery cells of each row are staggered with the battery cells of an adjacent row. The outer casing defines therein an accommodation space for accommodation of the battery cells, and has a first port unit and a second port unit which are configured to permit a cooling fluid to flow through the accommodation space from one of the first and second port units to the other one of the first and second port units so as to allow the battery cells to be cooled by the cooling fluid. The cell fixture includes a holding web which is fitted inside the accommodation space, and which is formed with a plurality of rows of retaining holes. The retaining holes of each row are staggered with the retaining holes of an adjacent row, and are configured to retain the cell bodies of a respective row of the battery cells so as to permit the battery cells to be held in the accommodation space by the holding web, to thereby keep the battery cells in stable position against undesired vibration.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
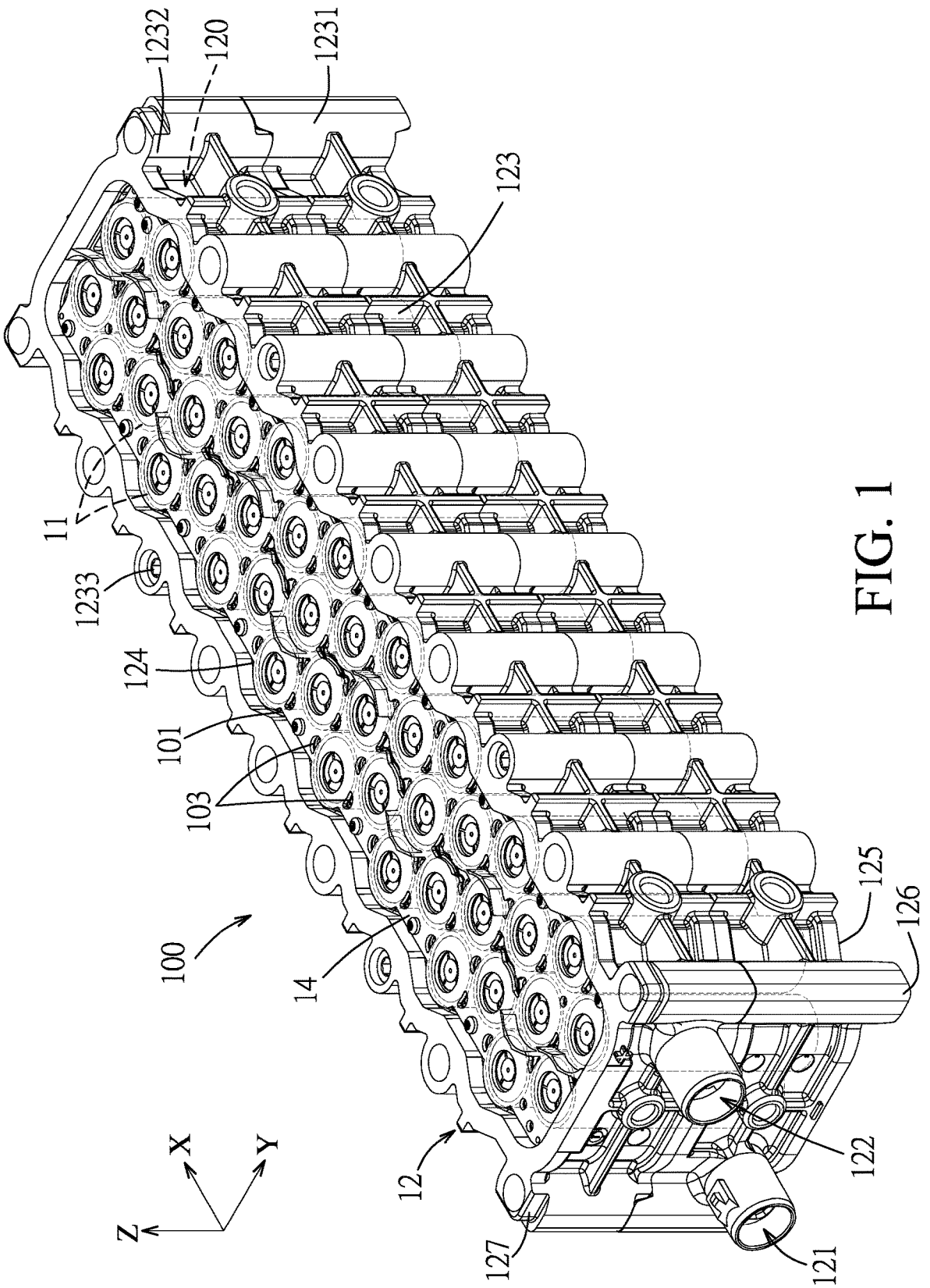
FIG. 1 is a perspective view of a battery module of a fluid-cooled battery system according to an embodiment of the disclosure.

Before the disclosure is described in greater detail, it should be noted that where considered appropriate, reference numerals have been repeated among the FIGS. to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Referring to FIGS. 1 to 5, a fluid-cooled battery system according to an embodiment of the disclosure is shown to include at least one battery module 100 which includes a plurality of rows of battery cells 11, an outer casing 12, and at least one cell fixture 13.

Each of the battery cells 11 has a cell body 110 extending in an upright direction (Z), and the battery cells 11 of each row are staggered with the battery cells 11 of an adjacent row. In an embodiment shown in FIG. 3, each of the battery cells 11 may have a first terminal 111 and a second terminal 112 which are opposite to each other in the upright direction (Z). One of the first and second terminals 111, 112 is a positive terminal, and the other of the first and second terminals 111, 112 is a negative terminal.

The battery cells 11 may be a rechargeable battery, for example, but not limited to, a Nickel-Cadmium (NiCd) battery, a Nickel-metal-hydride (NiMH) battery, or a Lithium-ion battery. In an embodiment, the battery cells 11 may be cylindrical Lithium ion 18650 cells or 21700 cells.

The outer casing 12 defines therein an accommodation space 120 for accommodation of the battery cells 11, and has a first opening 101 (see FIG. 1) and a second opening 102 (see FIG. 4) configured to permit a cooling fluid to flow through the accommodation space 120 from one of the first and second openings 101, 102 to the other one of the first and second openings 101, 102 so as to allow the battery cells 11 to be cooled by the cooling fluid. The cooling fluid is an inert dielectric fluid, and may provide a fire suppression capability. The cooling fluid may be, but is not limited to, mineral oil, silicone oil, ester-based oil, or engineered fluid, etc. In an embodiment, the cooling fluid is engineered fluid.

Figure 4:
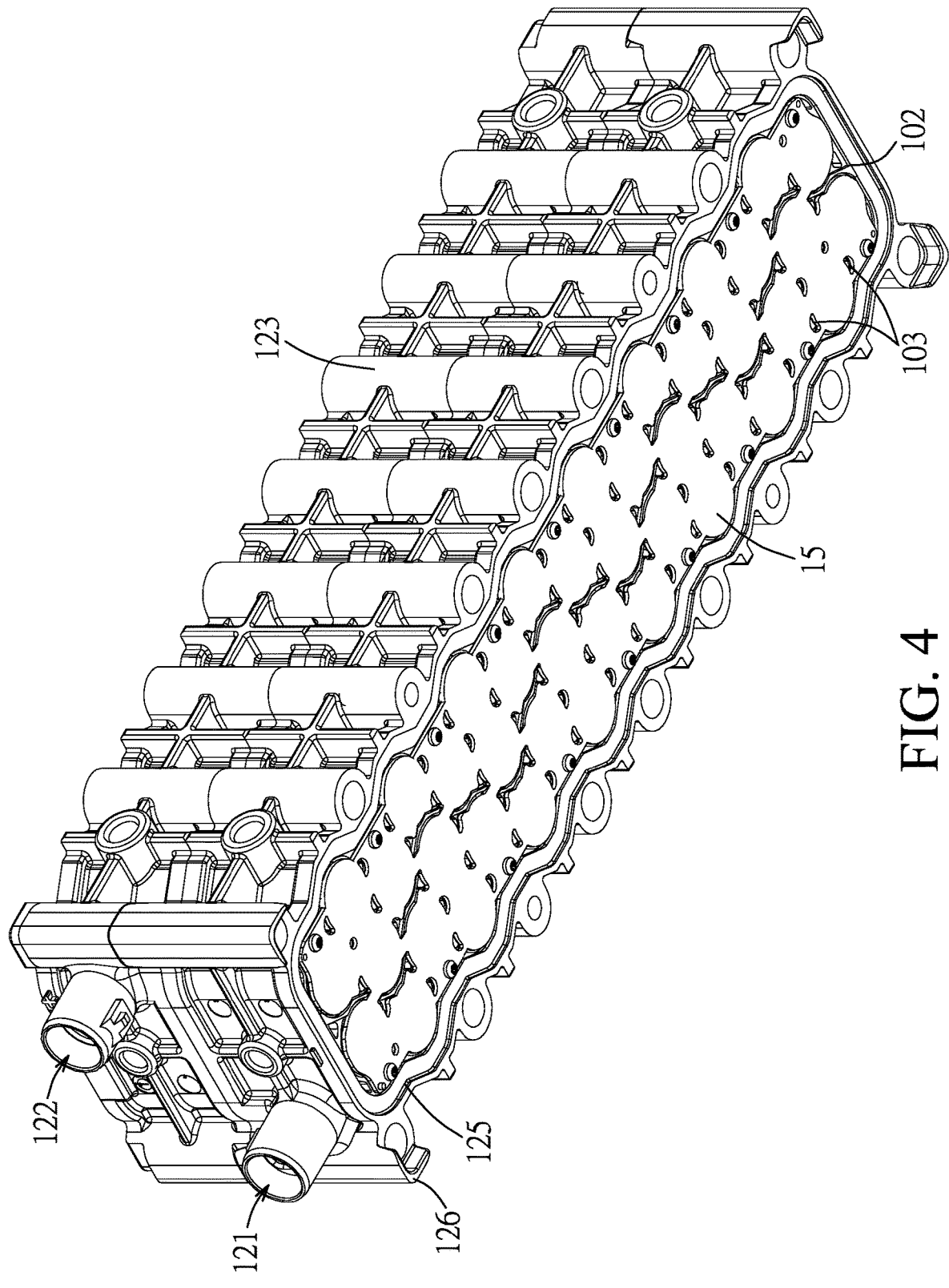
FIG. 4 is a bottom perspective view of the battery module.

In an embodiment shown in FIGS. 1 and 4, the outer casing 12 includes a surrounding wall 123 which defines the accommodation space 120, and which extends in the upright direction (Z) to terminate at a first surrounding edge 124 and a second surrounding edge 125. The first surrounding edge 124 defines the first opening 101 and the second surrounding edge 125 defines the second opening 102.

In an embodiment shown in FIG. 1, the surrounding wall 123 has a first surrounding segment 1231 and a second surrounding segment 1232 which is secured to the first surrounding segment 1231 through a plurality of bolts 1233. Alternatively, the first and second surrounding segments 1231, 1232 may be secured to each other by welding or bonding using an adhesive material.

Furthermore, a first port 121 is formed in the first surrounding segment 1231 and a second port 122 is formed in the second surrounding segment 1232. Alternatively, the first and second ports 121, 122 may be formed in the same one of the first and second surrounding segments 1231, 1232. The cooling fluid may further be introduced into the accommodation space 120 through one of the first and second ports 121, 122 and may be drained out through the other one of the first and second ports 121, 122.

In an embodiment, the outer casing 12 may be made from a plastic or polymer materials.

Figure 5:
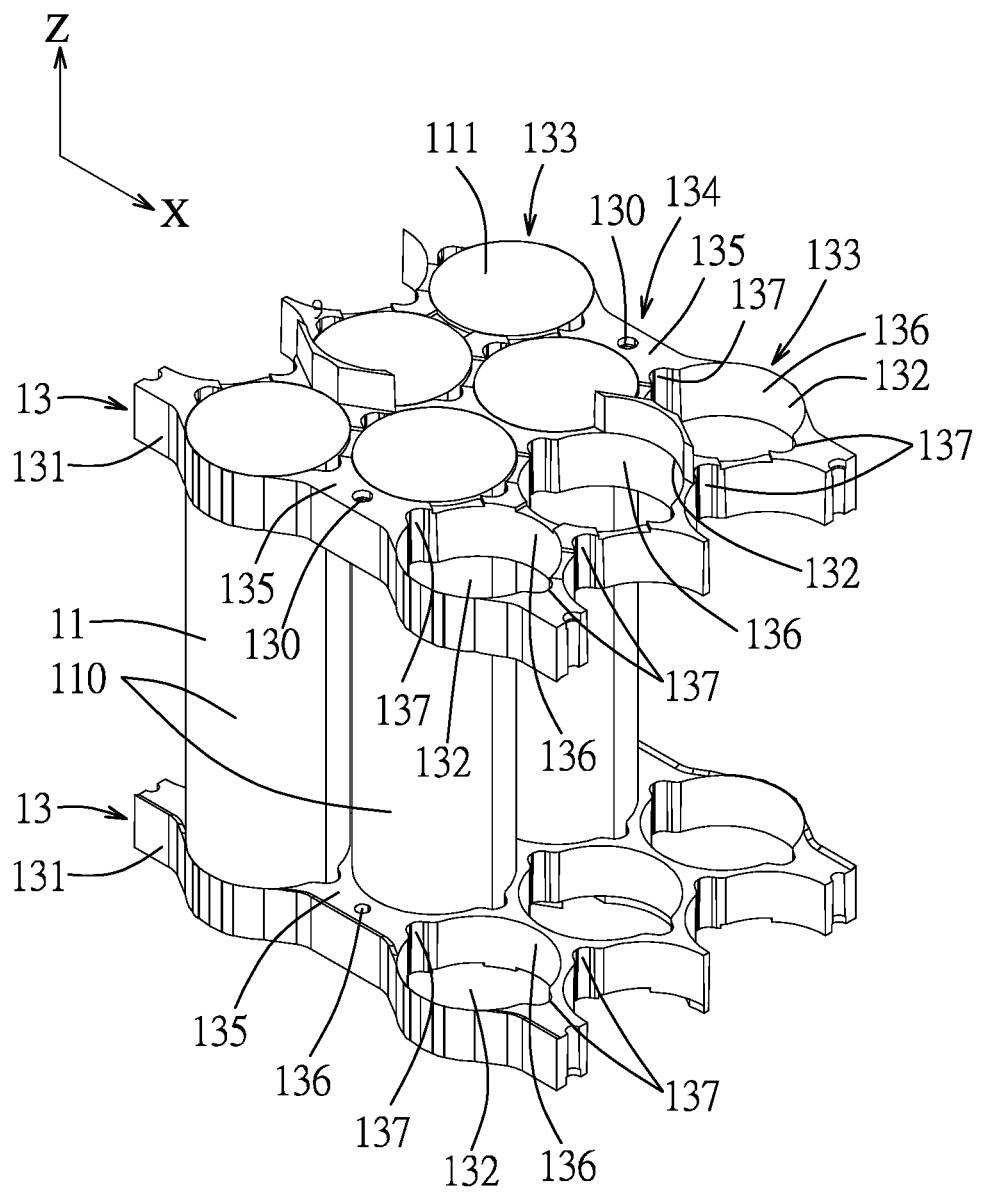
FIG. 5 is a fragmentary perspective view illustrating battery cells of the battery modules retained by two cell fixtures.

As shown in FIG. 5, the cell fixture 13 includes a holding web 131 which is fitted inside the accommodation space 120 shown in FIG. 1, and which is formed with a plurality of rows of retaining holes 132. The retaining holes 132 of each row are staggered with the retaining holes 132 of an adjacent row, and are configured to retain the cell bodies 110 of a respective row of the battery cells 11 so as to permit the battery cells 11 to be held in the accommodation space 120 by the holding web 131, to thereby keep the battery cells 11 in stable position against undesired vibration. In an embodiment, the first and second terminals 111, 112 of each battery cell 11 may be disposed at two opposite sides of the holding web 131.

In an embodiment shown in FIG. 5, the retaining holes 132 of each odd row 133 are staggered with the retaining holes 132 of an adjacent even row 134 to leave a pair of outboard regions 135 disposed outboard of the retaining holes 132 of the adjacent even row 134. Two through holes 130 may be formed respectively in the outboard regions 135 for passage of the cooling fluid.

In an embodiment shown in FIG. 5, the holding web 131 has a plurality of inner peripheral surfaces 136 which define the retaining holes 132, respectively. Each of the inner peripheral surfaces 136 may be formed with two grooves 137 which extend respectively in the upright direction (Z) to permit passage of the cooling fluid, and which are diametrically opposite to each other.

In an embodiment shown in FIG. 5, the rows of the retaining holes 132 are displaced from each other in a longitudinal direction (X).

In an embodiment shown in FIGS. 1 and 5, the battery module 100 includes two of the cell fixtures 13 which are displaced from each other in the upright direction (Z).

In an embodiment, the elements of the outer casing 12 are integrally formed. The cell fixtures 13 are fitted into the accommodation space 120 from the first and second openings 101, 102, respectively.

Figure 2:
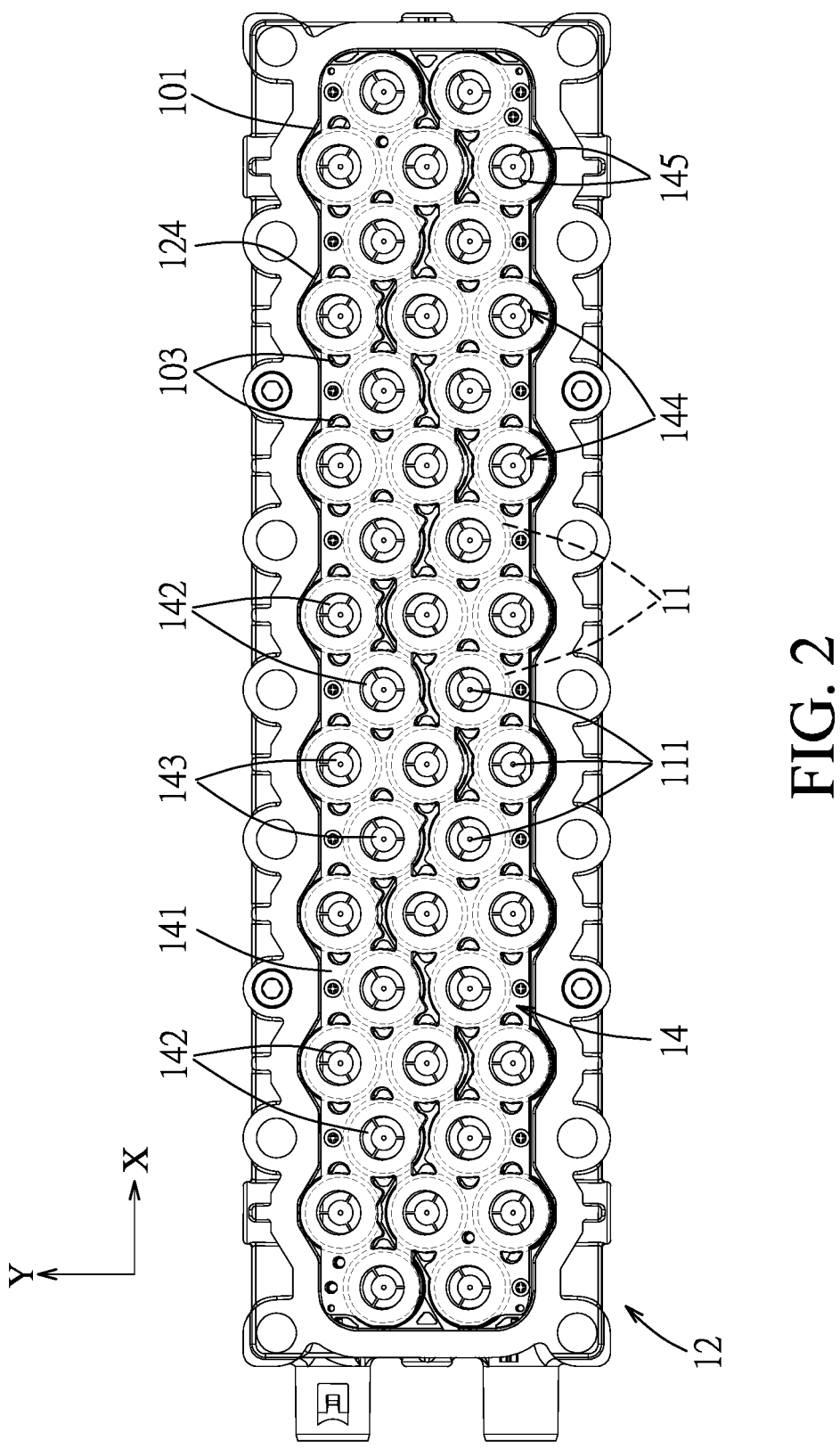
FIG. 2 is a top view of the battery module.
Figure 3:
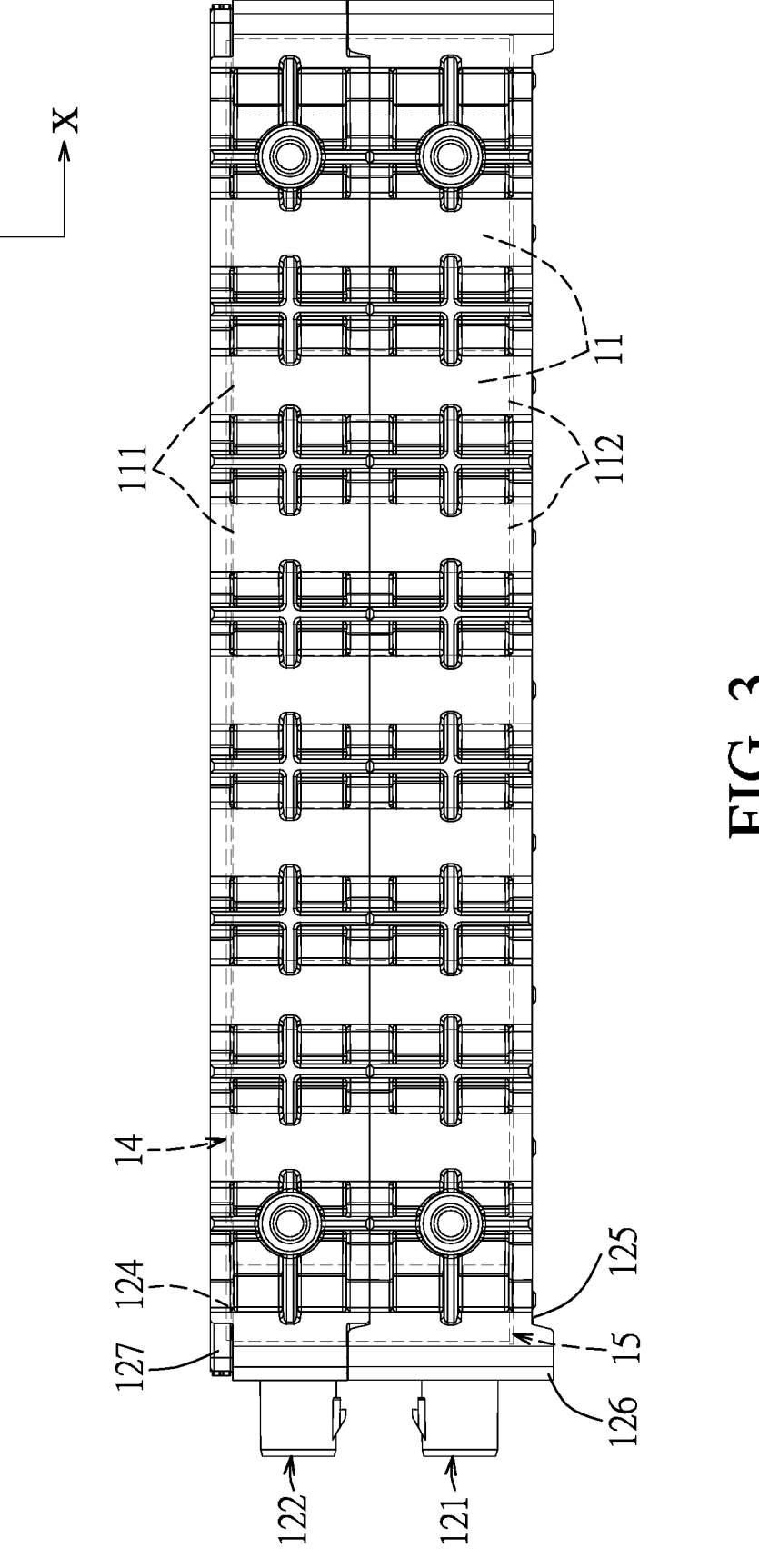
FIG. 3 is a side view of the battery module.

In an embodiment shown in FIGS. 2 to 4, the battery module 100 further includes a first electrode plate 14 which is electrically connected to the first terminals 111 of the battery cells 11, and a second electrode plate 15 which is electrically connected to the second terminals 112 of the battery cells 11.

In an embodiment, as shown in FIGS. 2 and 4, each of the first and second electrode plates 14, 15 is fitted in a respective one of the first and second openings 101, 102, and has a plurality of passing holes 103 for passage of the cooling fluid.

In an embodiment, the passing holes 103 shown in FIGS. 2 and 4 are in positions corresponding to the grooves 137 of the holding web 131 shown in FIG. 5.

In an embodiment shown in FIGS. 1 and 2, the first electrode plate 14 includes a plate body 141, a plurality of contact pads 143, and a plurality of fusible regions 144.

The plate body 141 is formed with a plurality of through bores 142 in positions corresponding to the first terminals 111 of the battery cells 11.

The contact pads 143 are disposed respectively in the through bores 142 to be in electrical contact with the first terminals 111 of the battery cells 11, respectively.

The fusible regions 144 are located respectively in the through bores 142, and each of the fusible regions 144 includes a plurality of fusible ribs 145 which are angularly displaced from each other and which extend radially from the respective contact pad 143 to the plate body 141 for electrically connecting the plate body 141 and the respective contact pad 143. When one of the battery cells 11 is overheated, the fusible ribs 145 of the corresponding fusible region 144 may melt for protection of the remaining battery cells 11.

The electrical connections among the battery cells 11 and the first and second electrode plates 14, 15 may heat up easily, the heat dissipating in the form of waste heat. If the battery cells 11 are electrically connected to the first and second electrode plates 14, 15 using a fuse element, the temperature change would adversely affect the fusing. The electrical connections being at a relatively high temperature may also adversely affect the efficiency of the battery modules. Cooling the electrical connections by submerging it in the cooling fluid improves efficiency of the battery modules and reduces power wastage. Please note that the battery module differs from the conventional ones because the electrical connections are completely submerged in cooling fluid so as to facilitate the electrical connected to be cooled more efficiently.

Figure 6:
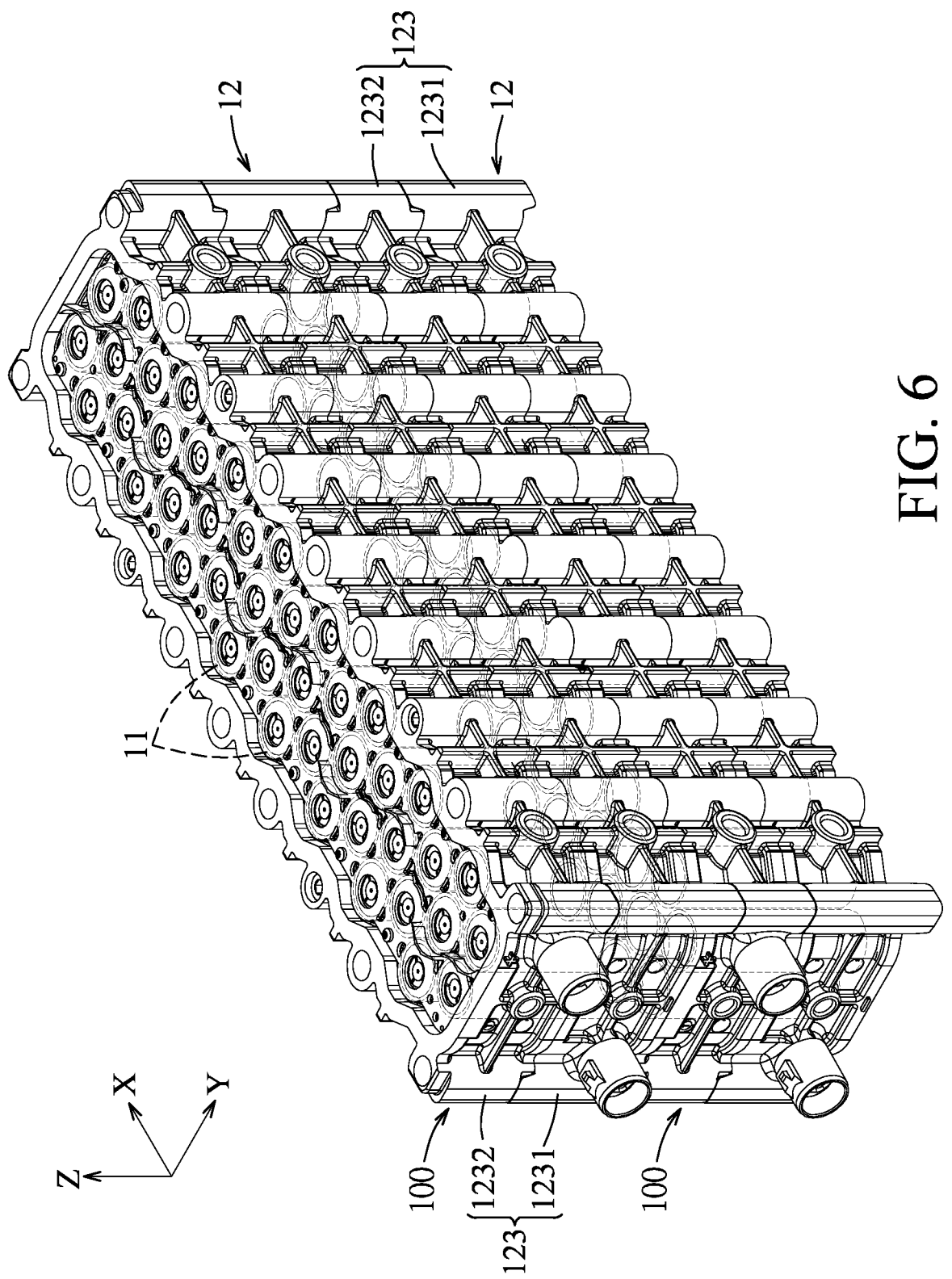
FIG. 6 is a perspective view illustrating two of the battery modules assembled together.

In an embodiment shown in FIG. 6, the fluid-cooled battery system includes a plurality of the battery modules 100 shown in FIG. 1. The outer casing 12 shown in FIGS. 1, 2, and 4 may further include a female edge extension 127 and a male edge extension 126 which respectively extend from the first and second surrounding edges 124, 125, and which are configured to mate with each other. When the male edge extension 126 of one of the battery modules 10 is brought into mating engagement with the female edge extension 127 of an adjacent one of the battery modules 10, the first electrode plate 14 of the one of the battery modules 100 is brought into electrical contact with the second electrode plate 15 of the adjacent one of the battery modules 100. In this way, the battery modules 100 may be stacked like interlocking building blocks (e.g., LEGO building blocks) to form a battery pack.

Figure 8:
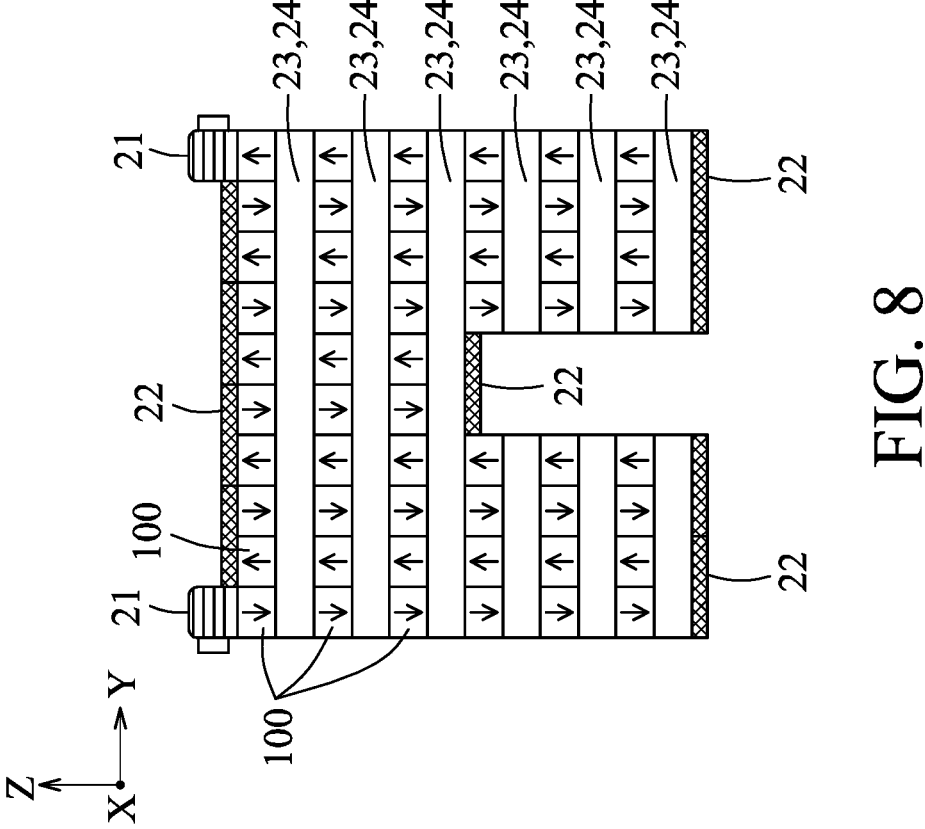
FIG. 8 is another side view of the fluid-cooled battery system.
Figure 7:
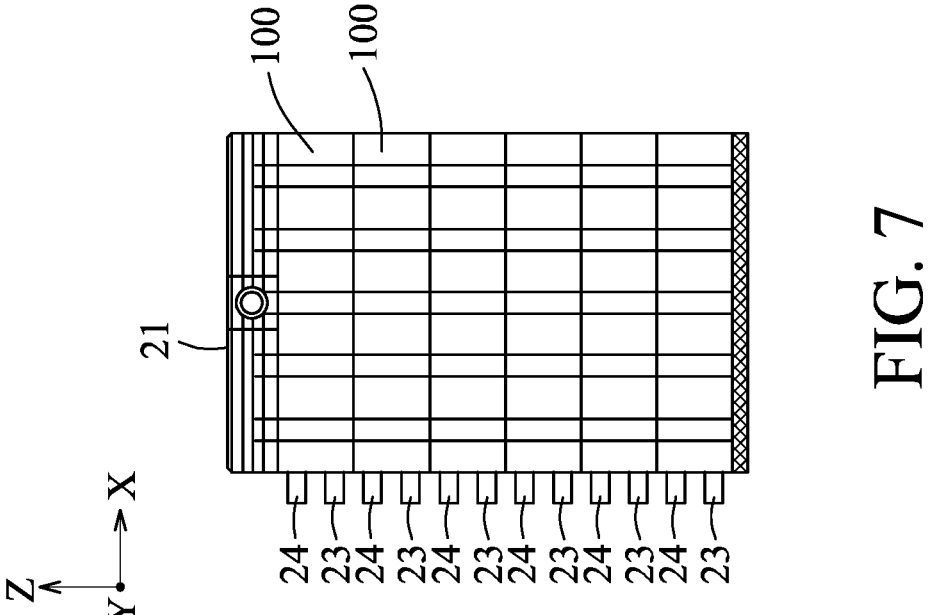
FIG. 7 is a side view of the fluid-cooled battery system with a plurality of the battery modules.

In an embodiment shown in FIGS. 7 and 8, the fluid-cooled battery system includes a plurality of the battery modules 100 arranged in rows and columns, a pair of cover casings 21, a plurality of cover boards 22, a plurality of first manifolds 23, and a plurality of second manifolds 24.

The battery modules 100 of each column are connected to each other along the upright direction (Z) through the mating engagement between two adjacent male and female extensions 126, 127 shown in FIGS. 1, 2, and 4. The columns of the battery modules 100 are displaced from each other in the transverse direction (Y). The rows of the battery modules 100 are displaced from each other in the upright direction (Z). The outer casing 12 (as shown in FIG. 1) of the battery modules 100 of each row may be connected to each other through any possible means, such as those disclosed in co-pending U.S. patent application Ser. No. 15/080,882.

Each of the cover boards 22 is disposed to provide a fluid-tight seal with the battery modules 100 in the end row, and is formed with circuits for connecting the columns of the battery modules in series. The arrows in FIG. 8 may indicate directions of current flow of the fluid-cooled battery system. In other embodiments, columns of the battery modules 100 may be connected in parallel.

Each of the first manifolds 23 is configured to be in fluid communication with the first ports 121 (see FIG. 1) of a corresponding row of the battery modules 100. Each of the second manifolds 24 is configured to be in fluid communication with the second ports 122 (see FIG. 1) of a corresponding row of the battery modules 100. The cooling fluid may be pumped to flow through the battery modules 100 along the arrows shown in FIG. 8. In addition, the provision of the first and second manifolds 23 may permit the cooling fluid to flow in the transverse direction through the rows of the battery modules 100.

Each of the cover casings 21 is configured to provide a fluid-tight seal with a leading one and a trailing one of the battery modules 100, and has a circuit for electrically connecting the battery modules 100 of the fluid-cooled battery system to a motor generator (not shown) of an electric-powered vehicle (not shown). After the battery modules 100, the cover casings 21, the cover boards 22, and the first and second manifolds 23, 24 are assembled, the battery cells 11 inside the fluid-cooled battery system are fluid-tightly sealed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

6

What is claimed is:

1. A fluid-cooled battery system comprising at least one battery module which includes:

a plurality of rows of battery cells, each of said battery cells having a cell body extending in an upright direction, said battery cells of each row being staggered with said battery cells of an adjacent row;

a cooling fluid;

an outer casing defining therein an accommodation space for accommodation of said battery cells, and having a first opening and a second opening which are configured to permit said cooling fluid to flow through said accommodation space from one of said first and second openings to the other one of said first and second openings so as to allow said battery cells to be cooled by said cooling fluid;

a first cell fixture and a second cell fixture each of which is fitted inside said accommodation space, and each of which is formed with a plurality of rows of retaining holes, said retaining holes of each row being staggered with said retaining holes of an adjacent row, and being configured to retain said cell bodies of a respective row of said battery cells so as to permit said battery cells to be held in said accommodation space by said first cell fixture and said second cell fixture, to thereby keep said battery cells in stable position against undesired vibration, wherein each of said battery cells has a first terminal and a second terminal which are opposite to each other in the upright direction to be disposed at two opposite sides of each of said first cell fixture and said second cell fixture;

wherein said outer casing comprises a surrounding wall that extends in the upright direction from a first surrounding edge to a second surrounding edge;

wherein said first surrounding edge defines said first opening, and said second surrounding edge defines said second opening;

wherein said first terminal is disposed at a first holding web of said first cell fixture;

wherein said second terminal is disposed at a second holding web of said second cell fixture;

wherein said first holding web is disposed at said first surrounding edge and said second holding web is disposed at said second surrounding edge of said surrounding wall;

wherein said at least one battery module further includes a first electrode plate which is electrically connected to said first terminals of said battery cells, and a second electrode plate which is electrically connected to said second terminals of said battery cells;

wherein said battery cells, said first and second electrode plates, and electrical connections among said battery cells and said first and second electrode plates are completely submerged in said cooling fluid;

wherein said first electrode plate is fitted in said first opening, and said second electrode plate is fitted in said second opening such that said first electrode plate and said second electrode plate are submerged in said cooling fluid;

wherein each of said first surrounding edge and said second surrounding edge of said at least one battery module is configured to be brought into mating engagement with a first surrounding edge of an adjacent battery module that provides a fluid-tight seal with said at least one battery module, and is configured to be brought into mating engagement with a cover that provides a fluid-tight seal with said at least one battery module; and wherein said outer casing is configured such that when one of said first surrounding edge and said second surrounding edge of said at least one battery module is mated with said first surrounding edge of said adjacent battery module, said first electrode plate of said at least one battery module is brought into electrical contact with a second electrode plate of said adjacent battery module within a combined space formed by combining said accommodation space of said at least one battery module and an accommodation space of said adjacent battery module.

2. The fluid-cooled battery system according to claim 1, wherein said retaining holes of each odd row are staggered with said retaining holes of an adjacent even row to leave a pair of outboard regions disposed outboard of said retaining holes of the adjacent even row, two through holes being formed respectively in said outboard regions for passage of said cooling fluid.

3. The fluid-cooled battery system according to claim 2, wherein said cell fixture has a plurality of inner peripheral surfaces which define said retaining holes, respectively, each of said inner peripheral surfaces being formed with at least one groove which extends in the upright direction to permit passage of said cooling fluid.

4. The fluid-cooled battery system according to claim 3, wherein each of said inner peripheral surfaces is formed with two of said grooves which are diametrically opposite to each other.

5. The fluid-cooled battery system according to claim 1, wherein each of said first and second electrode plates has a plurality of passing holes for passage of said cooling fluid.

6. The fluid-cooled battery system according to claim 5, wherein said first electrode plate includes a plate body formed with a plurality of through bores in positions corresponding to said first terminals of said battery cells, a plurality of contact pads disposed respectively in said through bores to be in electrically contact with said first terminals of said battery cells, respectively, and a plurality of fusible regions located respectively in said through bores, and each of said fusible regions including a plurality of fusible ribs which are angularly displaced from each other and which extend radially from said respective contact pad to said plate body for electrically connection between said plate body and said respective contact pad.

7. The fluid-cooled battery system according to claim 5, wherein said passing holes are in positions corresponding to said grooves of said cell fixture.

8. The fluid-cooled battery system according to claim 1, wherein said cooling fluid is an inert dielectric fluid which provides a fire suppression capability.

9. The fluid-cooled battery system according to claim 8, wherein said cooling fluid is selected from the group consisting of mineral oil, silicone oil, ester-based oil, engineered fluid, or combinations thereof.

* * * * *